No. 750,697. PATENTED JAN. 26, 1904.
J. PROSKAUER.
KITCHEN FORK.
APPLICATION FILED SEPT. 26, 1903.
NO MODEL.
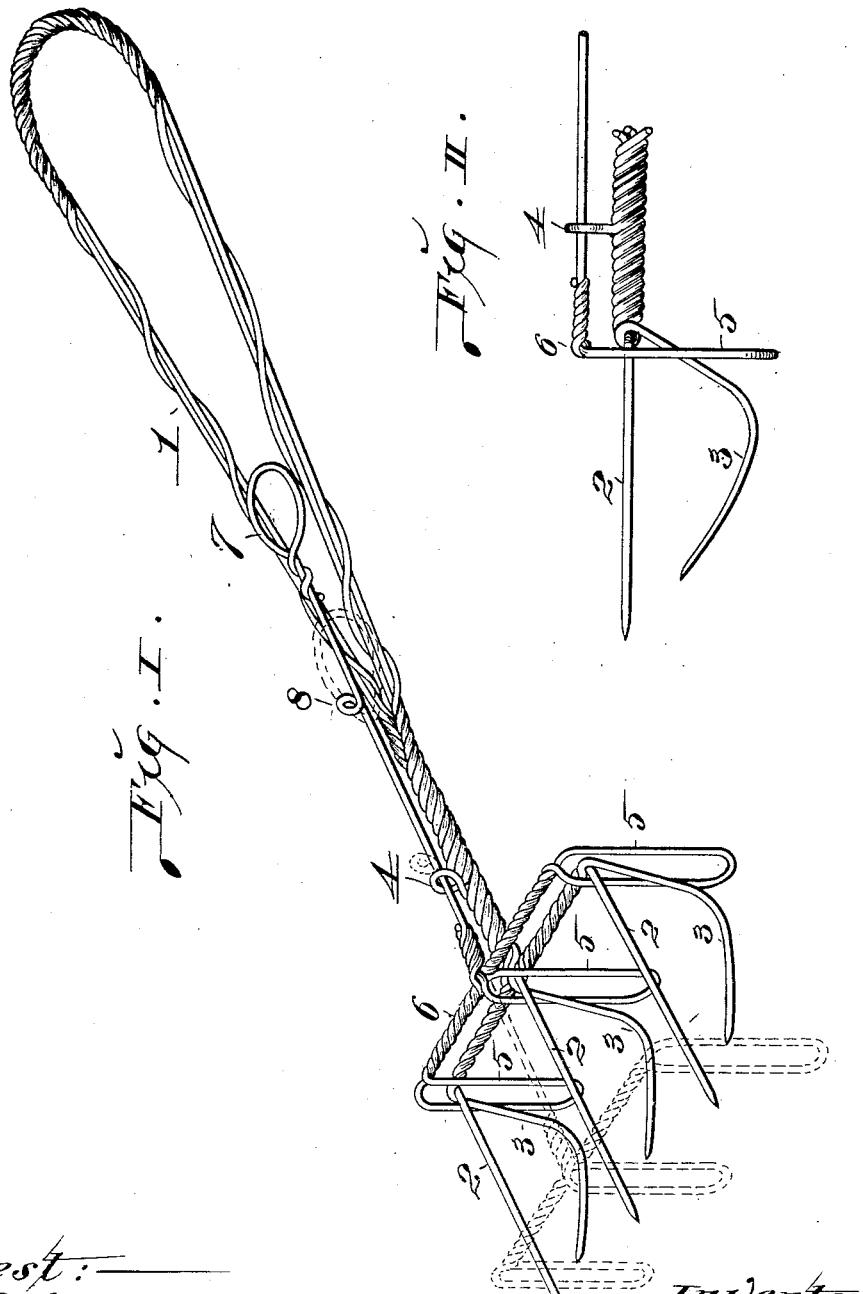
Inventor:
Jenny Proskauer.
By Knight Bro's Att'ys.
Attest:
M. P. Smith
F. S. Knight No. 750,697. Patented January 26, 1904.

UNITED STATES PATENT OFFICE.

JENNY PROSKAUER, OF ST. LOUIS, MISSOURI.

KITCHEN-FORK.

SPECIFICATION forming part of Letters Patent No. 750,697, dated January 26, 1904.

Application filed September 26, 1903. Serial No. 174,717. (No model.)

*To all whom it may concern:*

Be it known that I, JENNY PROSKAUER, a citizen of the United States, residing in the city of St. Louis, in the State of Missouri, have invented certain new and useful Improvements in Kitchen-Forks, of which the following is a full, clear, and exact description, reference being had to the accompanying drawings, forming part of this specification.

My invention relates to a fork for kitchen use, and, briefly stated, the article consists of a fork having a series of straight tines which may receive slices of bread to be toasted and a series of curved tines for use in lifting and handling foods, such as meats.

The invention also consists in means for discharging the articles impaled upon the tines of the fork.

My invention consists in features of novelty hereinafter fully described, and pointed out in the claims.

Figure I is a perspective view of my fork. Fig. II is a side view of the forward end of the fork.

The fork proper is made up of a plurality of wires, preferably three, which are looped intermediate of their ends to form a handle 1 and the ends of which are spread apart into separated positions to produce a series of straight upper tines 2 and a series of downturned curved lower tines 3. The outer looped end of the handle 1 is preferably produced by extending two of the wires of which the fork is made up in parallel lines and wrapping the third wire around the two parallel ones, and the inner shank portion of the handle is preferably formed by twisting all of the wires together, and from the shank portion one of the wires extends in a straight line to form the central upper tine 2, while the outer upper tines are bent at right angles to the handle-shank and then forwardly. The central lower tine 3 is produced by extending one of the wires downwardly from the handle-shank and then forwardly, and the two outer lower tines are produced by wrapping two of the wires leading from the shank around the angle portions of the outer upper tines, then extending the wires downwardly and forwardly. 4 is a loop formed from one of the wires in the shank of the handle 1.

5 designates a series of loops that straddle the upper and lower tines 2 and 3 in sets and are adapted for movement longitudinally of said tines to discharge any article that may be impaled thereon. These loops are carried by a cross-rod 6, made up of a wire from which the loops are also formed. The wire from which the cross-rod and loops are formed is extended rearwardly and passes through the loop 4, projecting from the handle-shank of the fork, and its rear end is looped into a handle 7. Between said handle and the loop 4 is a twist 8, that serves as a stop to limit the forward movement of the loops 5 when they are carried outwardly around the tines 2 and 3, thereby preventing the displacement of said loops from the tines when they are moved to perform their office.

A fork constructed in accordance with my invention is an article of great utility, furnishing, as it does, in one implement a series of straight tines for service in toasting bread and in various other capacities and a second series of curved tines upon which meats and other products which are difficult to handle may be impaled in a manner to prevent their slipping from the fork after they have been impaled thereon. The utility of the discharging means through the medium of which the article impaled on the tines of the fork is forced therefrom is apparent.

I claim as my invention—

1. In a fork, the combination of a handle, a series of upper straight tines projecting from said handle, and a series of downturned curved lower tines projecting from said handle, substantially as set forth.

2. In a fork, the combination of a handle, upper and lower tines carried by said handle, and discharging means slidingly connected to said handle and encircling said tines, substantially as set forth.

3. In a fork, the combination of a handle, upper and lower series of tines carried by said handle, and discharging means slidingly connected to said handle, said discharging means comprising a series of loops encircling said tines and a handle for moving said loops, substantially as set forth.

4. In a fork, the combination of a handle, upper and lower series of tines carried by said handle, and discharging means slidingly connected to said handle; said discharging means comprising a cross-rod, a series of loops carried by said cross-rod, a handle extending from said cross-rod, a stop carried by said handle, and a loop projecting from the shank of the fork-handle through which the handle of said discharging means operates, substantially as set forth.

JENNY PROSKAUER.

In presence of—
 NELLIE V. ALEXANDER,
 E. S. KNIGHT.